United States Patent
Zhang et al.

(10) Patent No.: US 9,817,532 B2
(45) Date of Patent: Nov. 14, 2017

(54) TOUCH PANEL AND DISPLAY DEVICE (71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Lei Zhang, Beijing (CN); Ming Hu, Beijing (CN); Taofeng Xie, Beijing (CN); Lingyan Wu, Beijing (CN); Yang Liu, Beijing (CN); Ming Zhang, Beijing (CN); Guodong Liu, Beijing (CN)

(73) Assignees: BOE TECHNOLOGY GROUP CO., LTD. (CN); HEFEI XINSHENG OPTOELECTRONICS TECHNOLOGY CO., LTD. (CN)

( * ) Notice: Subject to any disclaimer, the term of this patent is extended or adjusted under 35 U.S.C. 154(b) by 15 days.

(21) Appl. No.: 14/905,681

(22) PCT Filed: May 19, 2015

(86) PCT No.: PCT/CN2015/079253
§ 371 (c)(1),
(2) Date: Jan. 15, 2016

(87) PCT Pub. No.: WO2016/101516
PCT Pub. Date: Jun. 30, 2016

(65) Prior Publication Data
US 2016/0328046 A1 Nov. 10, 2016

(30) Foreign Application Priority Data
Dec. 26, 2014 (CN) .......................... 2014 1 0828783

(51) Int. Cl.
*G06F 3/044* (2006.01)

(52) U.S. Cl.
CPC .... *G06F 3/044* (2013.01); *G06F 2203/04111* (2013.01)

(58) Field of Classification Search
CPC ........ G06F 3/044; G06F 3/046; G06F 3/0416; G06F 2203/04111; G06F 2203/04101;
(Continued)

(56) References Cited

U.S. PATENT DOCUMENTS

2010/0231549 A1* 9/2010 Chien ................. G02F 1/13338
345/174
2012/0299867 A1* 11/2012 Yu ........................... G06F 3/044
345/174

(Continued)

FOREIGN PATENT DOCUMENTS

| CN | 103246409 A | 8/2013 |
|----|-------------|--------|
| CN | 103927035 A | 7/2014 |

(Continued)

OTHER PUBLICATIONS

Office Action in Chinese Patent Application No. 201410828783.2, dated Dec. 23, 2016.
(Continued)

*Primary Examiner* — Tom Sheng
(74) *Attorney, Agent, or Firm* — Brooks Kushman P.C.

(57) ABSTRACT

The present disclosure provides a touch panel and a display device. The touch panel includes a conductive layer which includes first electrode layers parallel arranged in columns in a Y-axis direction and second electrode layers parallel arranged in rows in an X-axis direction. Each first electrode layer includes first pattern electrodes sequentially connected, and each second electrode layer includes second pattern electrodes sequentially connected. Each first pattern electrode is of a hexagonal shape. The second pattern electrodes are arranged at a region between two adjacent
(Continued)

columns of the first electrode layers. A projection of a connection end between two adjacent second pattern electrodes in an identical row onto a plane parallel to the conductive layer partially overlaps a projection of a connection end between two adjacent first pattern electrodes in an identical column which are arranged adjacent to the two adjacent second pattern electrodes in an identical row.

20 Claims, 6 Drawing Sheets (58) Field of Classification Search
CPC . G06F 2203/04102; G06F 2203/04103; G06F 2203/0339
See application file for complete search history.

(56) References Cited

U.S. PATENT DOCUMENTS

| | | | | |
|---|---|---|---|---|
| 2013/0187871 A1* | 7/2013 | Kurashima | ............. | G06F 3/041 345/173 |
| 2014/0098057 A1 | 4/2014 | Lee et al. | | |
| 2014/0139481 A1* | 5/2014 | Han | ............. | G06F 3/044 345/174 |
| 2014/0160372 A1* | 6/2014 | Li | ............. | G06F 3/044 349/12 |
| 2014/0160373 A1* | 6/2014 | Hsu | ............. | G06F 3/044 349/12 |
| 2014/0197018 A1* | 7/2014 | Chen | ............. | H03K 17/9622 200/600 |
| 2014/0267155 A1* | 9/2014 | Aubauer | ............. | G01R 27/2605 345/174 |
| 2014/0362043 A1* | 12/2014 | Chu | ............. | G06F 3/044 345/174 |
| 2015/0060256 A1* | 3/2015 | Kim | ............. | G06F 3/044 200/600 |
| 2015/0287381 A1* | 10/2015 | Kim | ............. | G06F 3/044 345/174 |
| 2016/0124548 A1* | 5/2016 | Cherif | ............. | G06F 3/044 345/174 |
| 2017/0031490 A1* | 2/2017 | Hashida | ............. | G06F 3/041 |

FOREIGN PATENT DOCUMENTS

| | | |
|---|---|---|
| CN | 203930768 U | 11/2014 |
| CN | 203930769 U | 11/2014 |
| CN | 104461158 A | 3/2015 |
| CN | 204288177 U | 4/2015 |

OTHER PUBLICATIONS

International Search Report and Written Opinion in PCT International Application No. PCT/CN2015/079253, dated Oct. 8, 2015.

* cited by examiner

TOUCH PANEL AND DISPLAY DEVICE

CROSS-REFERENCE TO RELATED APPLICATION

The present application is the U.S. national phase of PCT Application No. PCT/CN2015/079253 filed on May 19, 2015, which claims a priority of Chinese patent application No. 201410828783.2 filed on Dec. 26, 2014, which is incorporated herein by reference in its entirety.

TECHNICAL FIELD

The present disclosure relates to the field of touch display technology, in particular to a touch panel and a display device.

BACKGROUND

Touch panels may be divided into two types including resistive and capacitive ones depending on their operating principles. Currently, the capacitive touch panels have been widely used in electronic products. The capacitive touch panel operates on the basis of current sensing by human body, i.e., it senses a touch signal through an electrode in conjunction with characteristics of the human body. When the touch panel is touched by the human body (e.g., a finger), a coupling capacitance is generated between the finger and a conductor layer of the touch panel due to an electric field of the human body, and a current generated by the electrode of the touch panel flows towards a touch point. Then, a position of the touch point can accurately calculated.

Usually, as a critical member of the touch panel, a conductive film includes a conductive layer and an insulating base material. The conductive layer is mainly made of indium tin oxide (ITO) and formed on the insulating base material through vacuum evaporation, patterning and etching, so as to form the conductive film. Then, the conductive film is adhered onto a transparent glass panel through an adhesive layer, so as to form the touch panel.

Figure 1:
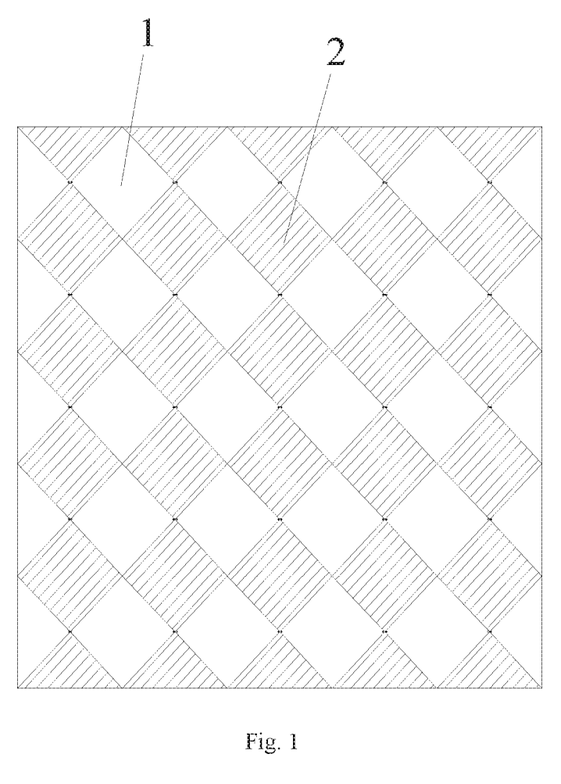
FIG. 1 is a schematic view showing a conductive layer of an existing touch panel.

As shown in FIG. 1, the conductive layer for the existing touch panel includes first pattern electrodes 1 and second pattern electrodes 2. The first pattern electrodes 1 are arranged in an X-axis direction, the second pattern electrodes 2 are arranged in a Y-axis direction, and intersection points formed thereby are the touch points. Usually, the first pattern electrodes 1 and the second pattern electrodes 2 are each of a diamond shape as shown in FIG. 1. This structure is single and vulnerable to interferences from the outside.

SUMMARY

An object of technical solutions of the present disclosure is to provide a touch panel and a display device, so as to provide a new structure of a conductive layer, thereby preventing the interferences from the outside.

The present disclosure provides in some embodiments a touch panel, including a conductive layer which includes first electrode layers parallel arranged in a plurality of columns in a Y-axis direction and second electrode layers parallel arranged in a plurality of rows in an X-axis direction. Each first electrode layer includes a plurality of first pattern electrodes sequentially connected to each other, and each second electrode layer includes a plurality of second pattern electrodes sequentially connected to each other. Each first pattern electrode is of a hexagonal shape, a plurality of the second pattern electrodes is arranged at a region between two adjacent columns of the first electrode layers, a first connection end is arranged between two adjacent first pattern electrodes in an identical column, a second connection end is arranged between two adjacent second pattern electrodes in an identical row, and projections of the first connection end and the second connection end onto a plane parallel to the conductive layer partially overlap each other.

Further, the second connection end is arranged between the two adjacent second pattern electrodes in an identical row which are positioned adjacent to the two adjacent first pattern electrodes in an identical column.

Further, each edge of the second pattern electrode is of a shape which is determined according to an edge of the first pattern electrode adjacent to the second pattern electrode.

Further, a third pattern electrode is arranged between the second pattern electrode and the first pattern electrode adjacent to each other, the third pattern electrode surrounds the first pattern electrode, and a fourth pattern electrode is arranged at a middle portion of each first pattern electrode.

Further, the fourth pattern electrode is of a shape identical to the first pattern electrode.

Further, each first pattern electrode is of a length of Py in the Y-axis direction and a length of D in the X-axis direction, each second pattern electrode is of a length of Px in the X-axis direction and a length of Py in the Y-axis direction, a gap between the first pattern electrode and its adjacent second pattern electrode and a gap between the two second pattern electrodes in two adjacent rows are both E, D=(Px−2*E)/2, Px and Py are each of a value within a range of 3 mm to 7 mm, and E is of a value within a range of 0.01 mm to 0.03 mm.

Further, the pattern electrodes are connected to each other directly via the electrode layer at one of the first connection end and the second connection end, the pattern electrodes are connected to each other via a bridge at the other of the first connection end and the second connection end, the first connection end or the second connection end where the pattern electrodes are connected to each other directly by the electrode layer is of a width G in the X-axis direction, and G is of a value within a range of 0.05 mm to 0.2 mm.

Further, the first pattern electrode, the second pattern electrode, the third pattern electrode and/or the fourth pattern electrode each have edges of a corrugated shape.

Further, the third pattern electrode includes at least two portions separated from each other, and each portion corresponds to one edge of the first pattern electrode.

Further, the first pattern electrode is of a hexagonal shape symmetrical in the X-axis direction and the Y-axis direction and includes two edges opposite to each other and parallel to the Y-axis direction, and the second pattern electrode includes two edges opposite to each other and parallel to the X-axis direction.

Further, the first pattern electrode is of a length of Py in the Y-axis direction; the second pattern electrode is of a length of Px in the X-axis direction; the third pattern electrode is of a width of A, the first pattern electrode is of a width of B, a gap between the third pattern electrode and its adjacent first pattern electrode and a gap between the third pattern electrode and its adjacent second pattern electrode are both E, a gap between the two adjacent second pattern electrodes in two adjacent rows is also E, and a distance between two edges of the first pattern electrode opposite to each other and parallel to the Y-axis direction is D. When Px and Py are each of a value greater than or equal to 3 mm and less than or equal to 4 mm, A is of a value within a range from 0.1 mm to 0.3 mm, B is of a value within a range from 0.2 mm to 0.4 mm, E is of a value within a range from 0.01 mm to 0.03 mm and $D=(Px-2*E-2*A)/2$. When Px and Py are each of a value greater than 4 mm and less than or equal to 5 mm, A is of a value within a range from 0.13 mm to 0.33 mm, B is of a value within a range from 0.25 mm to 0.45 mm, E is of a value within a range from 0.01 mm to 0.03 mm and $D=(Px-2*E-2*A)/2$. When Px and Py are each of a value greater than 5 mm and less than or equal to 6 mm, A is of a value within a range from 0.18 mm to 0.38 mm. B is of a value within a range from 0.3 mm to 0.5 mm, E is of a value within a range from 0.01 mm to 0.03 mm and $D=(Px-2*E-2*A)/2$. When Px and Py are each of a value greater than 6 mm and less than or equal to 7 mm, A is of a value within a range from 0.23 mm to 0.43 mm, B is of a value within a range from 0.4 mm to 0.6 mm, E is of a value within a range of 0.01 mm to 0.03 mm, and $D=(Px-2*E-2*A)/2$.

Further, the third pattern electrode is arranged at both sides of the first connection end, a top surface of the third pattern electrode adjacent to the first connection end is spaced apart from the first connection end at a predetermined distance I, and I is of a value within a range from 0.4 mm to 0.8 mm.

Further, the Y-axis direction is a column direction, and the X-axis direction is a row direction.

Further, the X-axis direction and the Y-axis direction crisscross.

The present disclosure provides in some embodiments a display device including a display substrate and the above-mentioned touch panel.

At least one of the above technical solutions according to the embodiments of the present disclosure has following beneficial effects.

In the touch panel, each first pattern electrode is of a hexagonal shape, each second pattern electrode is arranged between the first pattern electrodes in two adjacent columns, and the shape and size of the second pattern electrode are designed in accordance with those of the first pattern electrode. As compared with the related art where the first pattern electrodes and the second pattern electrodes are each of a diamond shape, in the embodiments of the present disclosure, the second pattern electrode with a large area is defined between the first pattern electrodes in two adjacent columns, so as to form a TX pattern with a large area, thereby effectively preventing the interference from the outside.

DETAILED DESCRIPTION

In order to make the objects, the technical solutions and the advantages of the present disclosure more apparent, the present disclosure will be described hereinafter in conjunction with the drawings and embodiments.

The present disclosure provides in some embodiments a touch panel including a conductive layer. The conductive layer includes first electrode layers arranged in a plurality of columns in a Y-axis direction and parallel to each other, and second electrode layers arranged in a plurality of rows in an X-axis direction and parallel to each other. Each first electrode layer includes a plurality of first pattern electrodes sequentially connected to each other, and each second electrode layer includes a plurality of second pattern electrodes sequentially connected to each other.

Each first pattern electrode is of a hexagonal shape. A plurality of the second pattern electrodes is arranged at a region between two adjacent columns of the first electrode layers. A first connection end is arranged between two adjacent first pattern electrodes in an identical column, a second connection end is arranged between two adjacent second pattern electrodes in an identical row. Projections of the first connection end and the second connection end onto a plane parallel to the conductive layer partially overlap each other.

According to the touch panel in the embodiments of the present disclosure, each first pattern electrode is of a hexagonal shape, each second pattern electrode is arranged between the first pattern electrodes in two adjacent columns; a shape and a size of the second pattern electrode are designed in accordance with those of the first pattern electrode, and then a new electrode pattern is defined as compared with the related art where the first pattern electrodes and the second pattern electrodes are each of a diamond shape. In the embodiments of the present disclosure, the second pattern electrode with a large area is defined between the first pattern electrodes in two adjacent columns, so as to form a TX pattern with a large area, thereby effectively preventing the interference from the outside.

In the embodiments of the present disclosure, a direction where the plurality of second electrode layers is arranged is defined as an X-axis direction, and a direction where the plurality of first electrode layers is arranged is defined as a Y-axis direction. To be specific, the X-axis direction and the Y-axis direction crisscross, but they may not necessarily correspond to a horizontal direction and a vertical direction in common sense, respectively.

In addition, it should be appreciated that, the first electrode layers and the second electrode layers may be arranged at an identical plane or at different planes. When the first electrode layers and the second electrode layers are arranged at an identical layer, an electrically insulating layer is further arranged at least between the connection end at each first electrode layer and the connection end at each second electrode layer. In other words, the electrically insulating layer is arranged between the first connection end of two adjacent first electrode layers and the second connection end of two adjacent second electrode layers.

Figure 2:
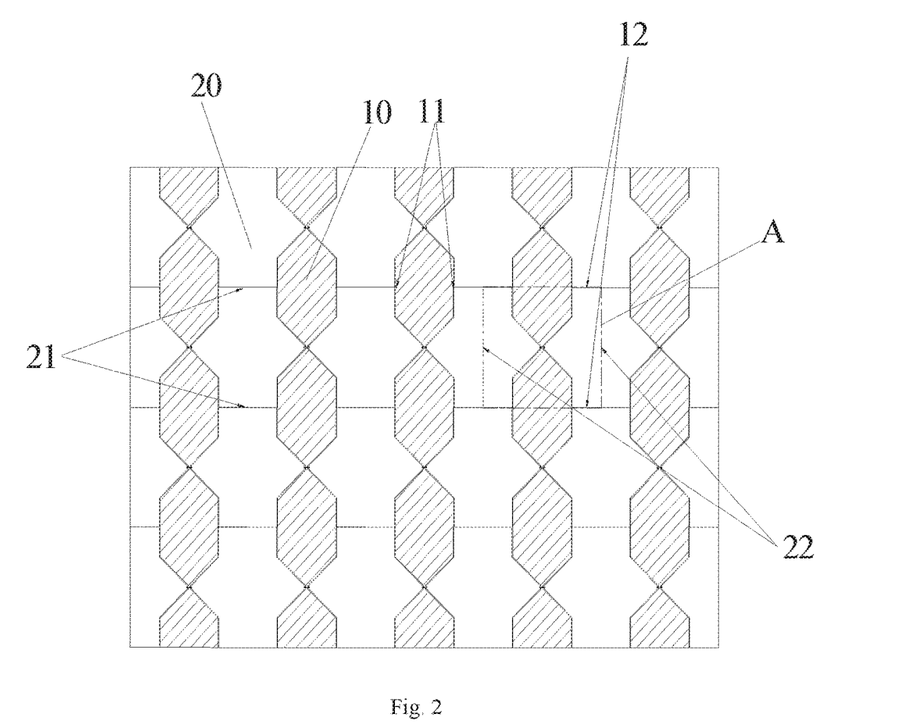
FIG. 2 is a plan view of a conductive layer of a touch panel according to the first embodiment of the present disclosure.
Figure 3:
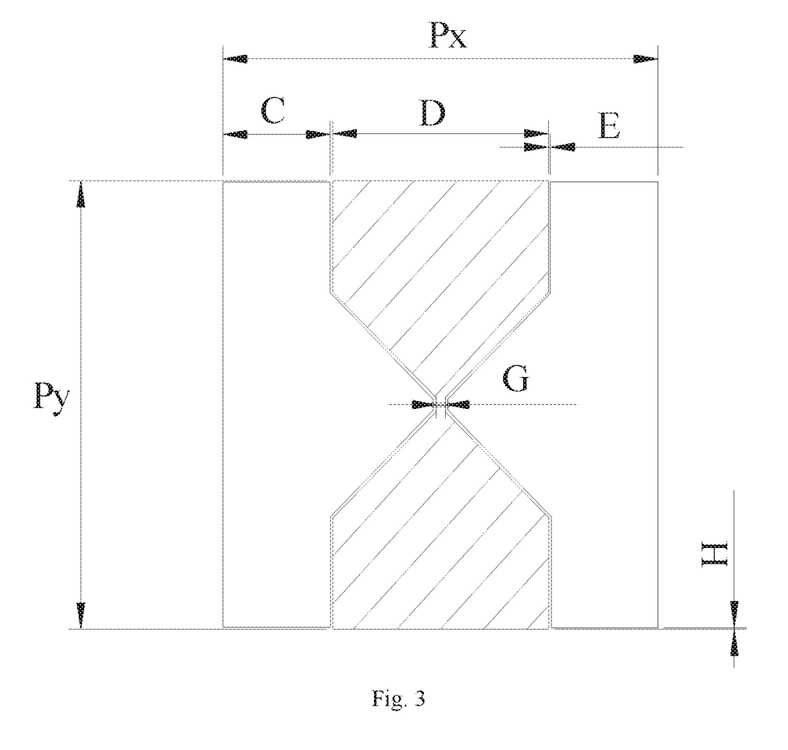
FIG. 3 is a topical view of a conductive pattern in FIG. 2.

Referring to FIG. 2 is a plan view of the conductive layer of the touch panel according to the first embodiment of the present disclosure, and FIG. 3 is a topical view of a conductive pattern in FIG. 2.

Referring to FIGS. 2-3, in the first embodiment, the conductive layer of the touch panel includes first electrode layers arranged in the Y-axis direction and second electrode layers arranged in the X-axis direction. Each first electrode layer includes a plurality of first pattern electrodes 10 sequentially connected to each other, and each second electrode layer includes a plurality of second pattern electrodes 20 sequentially connected to each other. Each first pattern electrode 10 is of a hexagonal shape, and each second pattern electrode 20 is arranged between the first pattern electrodes in two adjacent columns.

To be specific, each edge of the second pattern electrode 20 is of a shape corresponding to an edge of the first pattern electrode 10 adjacent to the second pattern electrode. In this way, as shown in FIG. 2, the second pattern electrodes 20 and the first pattern electrodes 10 are combined in an entire plane of the conductive layer in a jigsaw-puzzle manner.

In addition, a projection of a second connection end of two adjacent second pattern electrodes 20 in an identical row onto a plane where the conductive layer is located at least partially overlaps a projection of a first connection end of two adjacent first pattern electrodes 10 in an identical column. The plane where the conductive layer is located is also parallel to the first pattern electrodes 10 and the second pattern electrodes 20. Referring to FIG. 3, in the embodiment of the present disclosure, the first connection end is arranged between the two adjacent first pattern electrodes 10, and the second connection end is arranged between the two adjacent second pattern electrodes 20. The first pattern electrodes are connected to each other directly via the electrode layer at the first connection end, and the first connection end has a width G in the X-axis direction. A bridge is arranged at the second connection end so as to connect the two adjacent second pattern electrodes 20 across the first connection end for connecting the two adjacent first pattern electrodes 10. It should be appreciated that, in the actual design of the touch panel, the connection modes for the first pattern electrodes 10 and the second pattern electrodes 20 are not limited to the above. For example, the two adjacent second pattern electrodes 20 may be connected to each other directly by the electrode layer at the second connection end, and the two adjacent first pattern electrodes 10 may be connected to each other via a bridge at the first connection end.

Further, referring to FIGS. 2 and 3, each first pattern electrode 10 is of a hexagonal shape symmetrical in both the X-axis direction and the Y-axis direction, and includes two edges 11 opposite to each other and parallel to the Y-axis direction. Each second pattern electrode 20 includes two edges 21 opposite to each other and parallel to the X-axis direction. To be specific, each first pattern electrode has a length of Py in the Y-axis direction and a length of D in the X-axis. Each second pattern electrode has a length of Px in the X-axis direction and a length of Py in the Y-axis direction. Referring to FIGS. 2 and 3 again, the structures of the first pattern electrodes 10 and the second pattern electrodes 20 will be described by taking a region delimited by two central lines 12 of the two adjacent first pattern electrodes 10 parallel to the X-axis direction and two central lines 22 of the two adjacent second pattern electrodes 20 parallel to the Y-axis direction as an example. It should be appreciated that, a distance between the two central lines 12 of the two adjacent first pattern electrodes 10 parallel to the X-axis direction is equal to the length of the first pattern electrode in the Y-axis direction, i.e., Py, and a distance between the two central lines 22 of the two adjacent second pattern electrodes 20 parallel to the Y-axis direction is equal to the length of the second pattern electrode in the X-axis direction, i.e., Px. FIG. 3 shows a pattern formed at a region between the central lines 12 of the two adjacent first pattern electrodes 10 parallel to the X-axis direction and between the central lines 22 of the two adjacent second pattern electrodes 20 parallel to the Y-axis direction, i.e., a pattern at region A in FIG. 2.

In the embodiment of the present disclosure, a gap between the two adjacent second pattern electrodes 20 in two adjacent rows is E. As shown in FIG. 3, there is a gap H between the central line 12 of the first pattern electrode 10 parallel to the X-axis direction and the edge 21 (see FIG. 2) of the second pattern electrode 20 parallel to the X-axis direction, and H is of a value equal to E/2.

Optionally, there is also the gap E between the corresponding edges of the first pattern electrode 10 and the second pattern electrode 20.

In the embodiment of the present disclosure, when the length of the first pattern electrode 10 in the Y-axis direction is Py and the length of the second pattern electrode 20 in the X-axis direction is Px, i.e., when, as shown in FIG. 3, the distance between the central lines of the two adjacent first pattern electrodes 10 in an identical column parallel to the X-axis direction is Py and the distance between the central lines of the two adjacent second pattern electrodes 20 in an identical row parallel to the Y-axis direction is Px, the first pattern electrode 10 is of a length D in the X-axis direction (i.e., a distance between the two edges 11 opposite to each other and parallel to the Y-axis direction is D), and a distance between the central line of the second pattern electrode 20 parallel to the Y-axis direction and the adjacent edge parallel to the Y-axis direction is C. Optionally, the values of the above parameters may be determined according to in the following Table 1, and Px and Py may be of an identical value or different values.

TABLE 1

| Parameters | Values (mm) |
|---|---|
| Px(Py) | 3 ≤ Px(Py) ≤ 7 |
| C | (Px − 2 × E)/4 |
| D | (Px − 2 * E)/2 |
| E | 0.01~0.03 |
| G | 0.05~0.2 |
| H | E/2 |

According to the touch panel in the first embodiment of the present disclosure, a new electrode pattern is provided as compared with the related art where the first pattern electrodes and the second pattern electrodes are all of a diamond shape. In addition, as shown in FIG. 2, the second pattern electrode between the two adjacent first pattern electrodes in two columns is of an area greater than the diamond-shaped second pattern electrode in the related art, i.e., a TX pattern with a large area is formed. As a result, it is able to effectively prevent the interference from the outside.

In addition, in the second embodiment, a third pattern electrode is arranged between the second pattern electrode and the first pattern electrode adjacent to each other, the third pattern electrode surrounds the first pattern electrode, and a fourth pattern electrode is arranged at a middle portion of each first pattern electrode.

A mutual capacitance is generated between the fourth pattern electrode and the third pattern electrode which is separately arranged between the first pattern electrode and the second pattern electrode, so as to adjust capacitance generated between the first pattern electrode and the second pattern electrode. In the second embodiment, optionally, the capacitance of the entire conductive layer is adjusted to 0.8 PF to 3 PF through the third pattern electrodes and the fourth pattern electrodes, so as to match a capacitance of a driver IC connected to the touch panel, thereby enabling the touch panel to be applicable to the driver ICs from different manufacturers. In addition, optionally, the capacitance of the touch panel in this embodiment is 1.1 PF to 1.6 PF, so as to provide an optimal touch effect.

Figure 4:
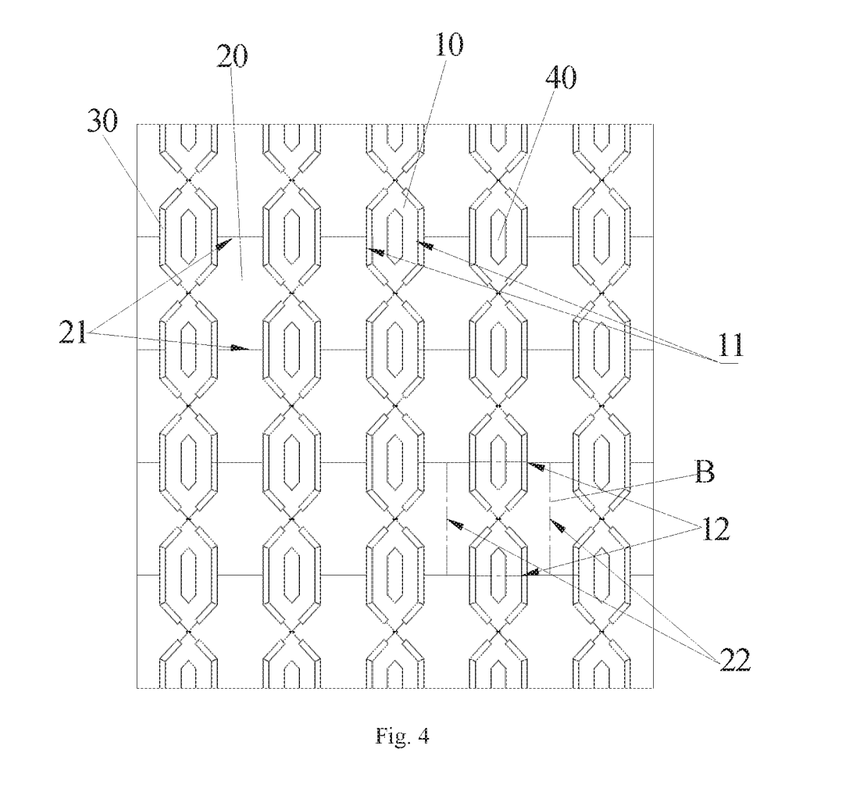
FIG. 4 is a plan view of the conductive layer of the touch panel according to the second embodiment of the present disclosure.
Figure 5:
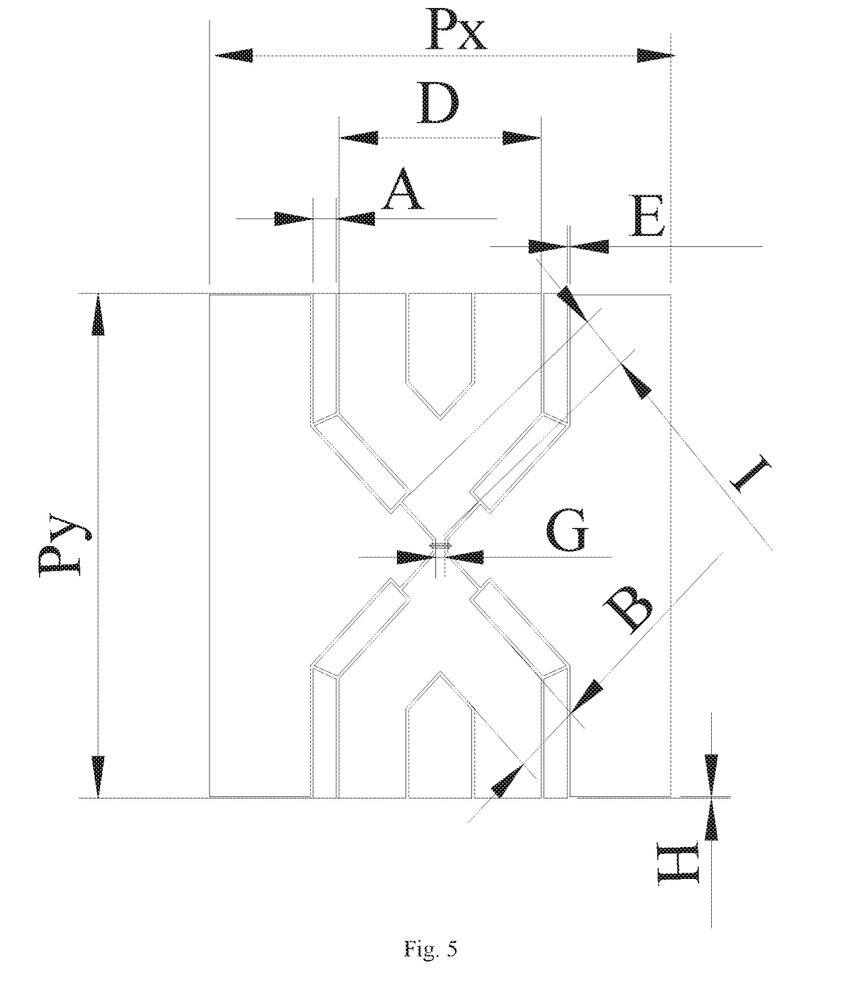
FIG. 5 is a topical view of a conductive pattern in FIG. 4.
Figure 6:
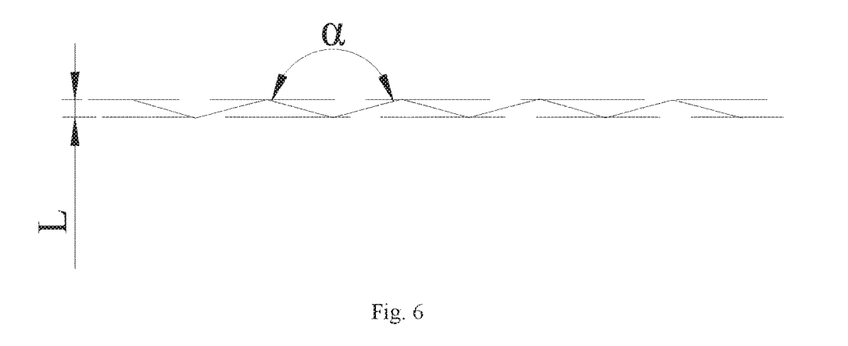
FIG. 6 is a schematic view showing a corrugated edge of each of a first pattern electrode, a second pattern electrode, a third pattern electrode and a fourth pattern electrode.

FIG. 4 is a plan view of the conductive layer according to the second embodiment of the present disclosure, and FIG. 5 is a topical, enlarged view of a conductive pattern in FIG. 4. On the basis of the first embodiment, for the conductive layer of the touch panel in the second embodiment, a third pattern electrode 30 is added between the first pattern electrode 10 and the second pattern electrode 20, and a fourth pattern electrode 40 is arranged inside the first pattern electrode 10.

Referring to FIGS. 4 and 5, each of the first pattern electrode 10 and the second pattern electrode 20 is of a shape identical to that mentioned in the first embodiment. To be specific, the first pattern electrode 10 is of a hexagonal shape, the second pattern electrode 20 is arranged between the first pattern electrodes 10 in two adjacent columns, and each edge of the second pattern electrode 20 is of a shape which is determined according to a shape of an edge of the first pattern electrode 10 adjacent to the second pattern electrode 20.

In addition, a projection of a second connection end of the two adjacent second pattern electrodes 20 in an identical row onto a plane parallel to the conductive layer at least partially overlaps a projection of a first connection end of the two adjacent first pattern electrodes 10 in an identical column. Referring to FIG. 5, in the second embodiment, the first connection end is arranged between the two adjacent first pattern electrodes 10, the first pattern electrodes are connected to each other directly via the electrode layer at the first connection end, and the first connection end has a width G in the X-axis direction. The second connection end is arranged between the two adjacent second pattern electrodes 20, and a bridge is arranged at the second connection end so as to connect the two adjacent second pattern electrodes 20 across the first connection end for connecting the two adjacent first pattern electrodes 10.

Further, referring to FIGS. 4 and 5, each first pattern electrode 10 is of a hexagonal shape symmetrical in both the X-axis direction and the Y-axis direction, and includes two edges 11 opposite to each other and parallel to the Y-axis direction. Each second pattern electrode also includes two edges 21 opposite to each other and parallel to the X-axis direction.

Each first pattern electrode has a length of Py in the Y-axis direction and a length of D in the X-axis. Each second pattern electrode has a length of Px in the X-axis direction and a length of Py in the Y-axis direction. Referring to FIGS. 4 and 5 again, the structures of the first pattern electrodes 10 and the second pattern electrodes 20 will be described by taking a region delimited by two central lines 12 of the two adjacent first pattern electrodes 10 parallel to the X-axis direction and two central lines 22 of the two adjacent second pattern electrodes 20 parallel to the Y-axis direction as an example. It should be appreciated that, a distance between the two central lines 12 of the two adjacent first pattern electrodes 10 parallel to the X-axis direction is equal to the length of the first pattern electrode in the Y-axis direction, i.e., Py, and a distance between the two central lines 22 of the two adjacent second pattern electrodes 20 parallel to the Y-axis direction is equal to the length of the second pattern electrode in the X-axis direction, i.e., Px.

FIG. 5 shows a pattern formed at a region between the central lines 12 of the two adjacent first pattern electrodes 10 parallel to the X-axis direction and between the central lines 22 of the two adjacent second pattern electrodes 20 parallel to the Y-axis direction, i.e., a pattern at region B in FIG. 4.

In the second embodiment of the present disclosure, a gap between the two adjacent second pattern electrodes 20 in two adjacent rows is E. As shown in FIG. 5, there is a gap H between the central line 12 of the first pattern electrode 10 parallel to the X-axis direction and the edge 21 (see FIG. 4) of the second pattern electrode 20 parallel to the X-axis direction, and H is of a value equal to E/2.

Based on the above structure, the third pattern electrode 30 is arranged between the edges of the first pattern electrode 10 and the second pattern electrode 20. In the second embodiment, the first pattern electrode 10 is of a hexagonal shape, so the third pattern electrode 30 may be arranged along each edge of the first pattern electrode 10, or along one or more edges of the first pattern electrode 10. In addition, when the third pattern electrode 30 is arranged along the edges of the first pattern electrode 10, its portions may be connected sequentially to each other, or spaced apart from each other (as shown in FIG. 5), depending on the capacitance to be adjusted.

In addition, in order to ensure the touch sensitivity of the first pattern electrode 10 and the second pattern electrode 20 at the connection ends, the third pattern electrode 30 is arranged at both sides of the first connection end, a top surface of the third pattern electrode adjacent to the first connection end is spaced apart from the first connection end at a predetermined distance I. as shown in FIG. 5.

Further, in the second embodiment of the present disclosure, the fourth pattern electrode 40 is of a shape identical to the first pattern electrode, and arranged at a center of the first pattern electrode 10.

Optionally, as shown in FIG. 5, there is a gap E between the third pattern electrode 30 and the first pattern electrode 10, between the third pattern electrode 30 and the second pattern electrode 20, and the fourth pattern electrode 40 and the first pattern electrode 10. The third pattern electrode 30 is of a width A, and the first pattern electrode 10 is of a width B. As shown in FIG. 4, the first pattern electrode 10 is a hexagonal ring shaped structure. In this embodiment, the width of the first pattern electrode 10 refers to a vertical distance between an edge of an inner ring and an edge of an outer ring of the ring shaped structure. In addition, there is a distance D between the two edges 11 of the first pattern electrode 10 opposite to each other and parallel to the Y-axis direction.

Optionally, the values of the above parameters may be determined according to in the following Table 2.

TABLE 2

| Px(Py)(mm) | A(mm) | B(mm) | D(mm) | I(mm) | E(mm) | G(mm) | H(mm) |
|---|---|---|---|---|---|---|---|
| 3 ≤ Px(Py) ≤ 4 | 0.1~0.3 | 0.2~0.4 | (Px−2*E−2*A)/2 | 0.4~0.8 | 0.01~0.03 | 0.05~0.2 | E/2 |
| 4 < Px(Py) ≤ 5 | 0.13~0.33 | 0.25~0.45 | | | | | |
| 5 < Px(Py) ≤ 6 | 0.18~0.38 | 0.3~0.5 | | | | | |
| 6 < Px(Py) ≤ 7 | 0.23~0.43 | 0.4~0.6 | | | | | |

Through the above design, it is able to control the capacitance of the touch panel between 0.8 PF and 3 PF, so as to match a capacitance of a driver IC connected to the touch panel (usually the capacitance of the driver IC is between 1 PF and 3 PF), thereby enabling the touch panel to be applicable to the driver ICs from different manufacturers. Table 3 shows capacitances of the touch panel obtained in accordance with the values of the parameters from the above. Experiments show that, in the case of the values of the parameters, it is able to control the capacitance of the touch panel between 0.8 PF to 3 PF, thereby matching the capacitance of the driver IC connected to the touch panel. Units for Px, Py, A, B, D, G, H, I and E are all mm.

TABLE 3

| Px(py) | A | B | D | G | H | I | E | Capacitance |
|---|---|---|---|---|---|---|---|---|
| 3 | 0.1~0.15 | 0.2~0.3 | (Px-2*E-2*A)/2 | 0.05~0.2 | E/2 | 0.4~0.8 | 0.01~0.03 | 0.8~1.6 |
| 4 | 0.1~0.2 | 0.2~0.35 | | | | | | 0.8~1.6 |
| 5 | 0.1~0.3 | 0.2~0.45 | | | | | | 0.8~2 |
| 6 | 0.1~0.35 | 0.2~0.5 | | | | | | 1.0~2.2 |
| 7 | 0.1~0.4 | 0.2~0.6 | | | | | | 1.0~3 |

In addition, in order to prevent the occurrence of interference fringes caused by the electrodes arranged in the X-axis direction and the Y-axis direction when the touch panel is applied to a display device, optionally, edges of each of the first pattern electrode, the second pattern electrode, the third pattern electrode and/or the fourth pattern electrode have a shape of corrugation with a width L in a range of from 0.1 mm to 0.3 mm, and an angle α in a range of from 20° to 160°.

The present disclosure further provides in some embodiments a display device including a display substrate and the above-mentioned touch panel. To be specific, when the touch panel and the display substrate are assembled into the display device, the first electrode layer extends in a direction identical to one of a data line and a gate line, and the second electrode layer extends in a direction identical to the other one of the data line and the gate line.

The above are merely the preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. A touch panel, comprising a conductive layer, the conductive layer comprising first electrode layers parallel arranged in a plurality of columns in a Y-axis direction and second electrode layers parallel arranged in a plurality of rows in an X-axis direction;
    wherein each first electrode layer comprises a plurality of first pattern electrodes sequentially connected to each other;
    each second electrode layer comprises a plurality of second pattern electrodes sequentially connected to each other;
    each first pattern electrode is of a hexagonal shape;
    a plurality of second pattern electrodes in a same column of different second electrode layers is arranged at a region between two adjacent columns of the first electrode layers;
    a first connection end is arranged between two adjacent first pattern electrodes in an identical column;
    a second connection end is arranged between two adjacent second pattern electrodes in an identical row;
    the first connection end and the second connection end are located at a corner where two sides of the first pattern electrode intersect; and
    projections of the first connection end and the second connection end onto a plane parallel to the conductive layer partially overlap each other.

2. The touch panel according to claim 1, wherein the second connection end is arranged between the two adjacent second pattern electrodes in an identical row which are positioned adjacent to the two adjacent first pattern electrodes in an identical column.

3. The touch panel according to claim 1, wherein each edge of the second pattern electrode is of a shape which is determined according to an edge of the first pattern electrode adjacent to the second pattern electrode.

4. The touch panel according to claim 1, wherein a third pattern electrode is arranged between the second pattern electrode and the first pattern electrode adjacent to each other, the third pattern electrode surrounds the first pattern electrode, and a fourth pattern electrode is arranged at a middle portion of each first pattern electrode.

5. The touch panel according to claim 4, wherein the fourth pattern electrode is of a shape identical to the first pattern electrode.

6. The touch panel according to claim 5, wherein the first pattern electrode is of a hexagonal shape symmetrical in the X-axis direction and the Y-axis direction and comprises two edges opposite to each other and parallel to the Y-axis direction, and the second pattern electrode comprises two edges opposite to each other and parallel to the X-axis direction.

7. The touch panel according to claim 6, wherein the first pattern electrode is of a length of Py in the Y-axis direction; the second pattern electrode is of a length of Px in the X-axis direction; the third pattern electrode is of a width of A, the first pattern electrode is of a width of B; a gap between the third pattern electrode and its adjacent first pattern electrode and a gap between the third pattern electrode and its adjacent second pattern electrode are both E, a gap between the two adjacent second pattern electrodes in two adjacent rows is also E, and a distance between two edges of the first pattern electrode opposite to each other and parallel to the Y-axis direction is D;
    when Px and Py are each of a value greater than or equal to 3 mm and less than or equal to 4 mm, A is of a value within a range from 0.1 mm to 0.3 mm, B is of a value within a range from 0.2 mm to 0.4 mm, E is of a value within a range from 0.01 mm to 0.03 mm and D=(Px−2*E−2*A)/2;
    when Px and Py are each of a value greater than 4 mm and less than or equal to 5 mm, A is of a value within a range from 0.13 mm to 0.33 mm, B is of a value within a range from 0.25 mm to 0.45 mm, E is of a value within a range from 0.01 mm to 0.03 mm and D=(Px−2*E−2*A)/2;

when Px and Py are each of a value greater than 5 mm and less than or equal to 6 mm, A is of a value within a range from 0.18 mm to 0.38 mm, B is of a value within a range from 0.3 mm to 0.5 mm, E is of a value within a range from 0.01 mm to 0.03 mm and $D=(Px-2*E-2*A)/2$; and when Px and Py are each of a value greater than 6 mm and less than or equal to 7 mm, A is of a value within a range from 0.23 mm to 0.43 mm, B is of a value within a range from 0.4 mm to 0.6 mm, E is of a value within a range of 0.01 mm to 0.03 mm, and $D=(Px-2*E-2*A)/2$.

8. The touch panel according to claim 4, wherein the first pattern electrode, the second pattern electrode, the third pattern electrode and/or the fourth pattern electrode each have edges of a corrugated shape.

9. The touch panel according to claim 4, wherein the third pattern electrode comprises at least two portions separated from each other, and each portion corresponds to one edge of the first pattern electrode.

10. The touch panel according to claim 4, wherein the third pattern electrode is arranged at both sides of the first connection end, a top surface of the third pattern electrode adjacent to the first connection end is spaced apart from the first connection end at a predetermined distance I, and I is of a value within a range from 0.4 mm to 0.8 mm.

11. The touch panel according to claim 1, wherein each first pattern electrode is of a length of Py in the Y-axis direction and a length of D in the X-axis direction; each second pattern electrode is of a length of Px in the X-axis direction and a length of Py in the Y-axis direction; a gap between the first pattern electrode and its adjacent second pattern electrode and a gap between the two second pattern electrodes in two adjacent rows are both E, where $D=(Px-2*E)/2$, Px and Py are each of a value within a range of 3 mm to 7 mm, and E is of a value within a range of 0.01 mm to 0.03 mm.

12. The touch panel according to claim 1, wherein the pattern electrodes are connected to each other directly via the electrode layer at one of the first connection end and the second connection end, the pattern electrodes are connected to each via a bridge at the other of the first connection end and the second connection end; the first connection end or the second connection end where the pattern electrodes are connected to each other directly by the electrode layer is of a width G in the X-axis direction, and G is of a value within a range of 0.05 mm to 0.2 mm.

13. The touch panel according to claim 1, wherein the Y-axis direction is a column direction, and the X-axis direction is a row direction.

14. The touch panel according to claim 13, wherein the X-axis direction and the Y-axis direction crisscross.

15. A display device comprising a display substrate and the touch panel according to claim 1.

16. A touch panel, comprising a conductive layer, the conductive layer comprising first electrode layers parallel arranged in a plurality of columns in a Y-axis direction and second electrode layers parallel arranged in a plurality of rows in an X-axis direction;
wherein each first electrode layer comprises a plurality of first pattern electrodes sequentially connected to each other;
each second electrode layer comprises a plurality of second pattern electrodes sequentially connected to each other;
each first pattern electrode is of a hexagonal shape;
a plurality of second pattern electrodes in a same column of different second electrode layers is arranged at a region between two adjacent columns of the first electrode layers;
a first connection end is arranged between two adjacent first pattern electrodes in an identical column;
a second connection end is arranged between two adjacent second pattern electrodes in an identical row;
projections of the first connection end and the second connection end onto a plane parallel to the conductive layer partially overlap each other; and
a third pattern electrode is arranged between the second pattern electrode and the first pattern electrode adjacent to each other, the third pattern electrode surrounds the first pattern electrode, and a fourth pattern electrode is arranged at a middle portion of each first pattern electrode.

17. The touch panel according to claim 16, wherein the fourth pattern electrode is of a shape identical to the first pattern electrode.

18. The touch panel according to claim 16, wherein the first pattern electrode, the second pattern electrode, the third pattern electrode and/or the fourth pattern electrode each have edges of a corrugated shape.

19. The touch panel according to claim 16, wherein the third pattern electrode comprises at least two portions separated from each other, and each portion corresponds to one edge of the first pattern electrode.

20. A touch panel, comprising a conductive layer, the conductive layer comprising first electrode layers parallel arranged in a plurality of columns in a Y-axis direction and second electrode layers parallel arranged in a plurality of rows in an X-axis direction;
wherein each first electrode layer comprises a plurality of first pattern electrodes sequentially connected to each other;
each second electrode layer comprises a plurality of second pattern electrodes sequentially connected to each other;
each first pattern electrode is of a hexagonal shape;
a plurality of second pattern electrodes in a same column of different second electrode layers is arranged at a region between two adjacent columns of the first electrode layers;
a first connection end is arranged between two adjacent first pattern electrodes in an identical column;
a second connection end is arranged between two adjacent second pattern electrodes in an identical row;
projections of the first connection end and the second connection end onto a plane parallel to the conductive layer partially overlap each other; and
each first pattern electrode is of a length of Py in the Y-axis direction and a length of D in the X-axis direction; each second pattern electrode is of a length of Px in the X-axis direction and a length of Py in the Y-axis direction; a gap between the first pattern electrode and its adjacent second pattern electrode and a gap between the two second pattern electrodes in two adjacent rows are both E, where $D=(Px-2*E)/2$, Px and Py are each of a value within a range of 3 mm to 7 mm, and E is of a value within a range of 0.01 mm to 0.03 mm.

* * * * *